(12) United States Patent
Heitkamp et al.

(10) Patent No.: US 6,981,087 B1
(45) Date of Patent: Dec. 27, 2005

(54) MULTI-MASTER AND DIVERSE SERIAL BUS IN A COMPLEX ELECTRICAL SYSTEM

(75) Inventors: Ross Heitkamp, Mountain View, CA (US); Michael Armstrong, Sunnyvale, CA (US); Michael Beesley, Hillsborough, CA (US); Ashok Krishnamurthi, San Jose, CA (US); Kenneth Richard Powell, Palo Alto, CA (US); Mike M. Wu, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 935 days.

(21) Appl. No.: 09/751,449

(22) Filed: Jan. 2, 2001

(51) Int. Cl.[7] .................. G06F 13/00; G06F 13/14; G06F 13/368
(52) U.S. Cl. ............... 710/301; 710/300; 710/305; 710/119
(58) Field of Search .................. 710/300, 305, 710/309, 107, 113, 119, 301, 302

(56) References Cited

U.S. PATENT DOCUMENTS

| | | | | |
|---|---|---|---|---|
| 4,845,736 A | * | 7/1989 | Posner et al. ............ 379/27.01 |
| 5,185,693 A | * | 2/1993 | Loftis et al. .................. 700/82 |
| 5,957,985 A | * | 9/1999 | Wong et al. ................... 701/33 |
| 6,122,756 A | * | 9/2000 | Baxter et al. .................. 714/30 |
| 6,202,097 B1 | * | 3/2001 | Foster et al. ................. 709/238 |
| 6,273,771 B1 | * | 8/2001 | Buckley et al. ............... 440/84 |
| 6,301,623 B1 | * | 10/2001 | Simpson et al. ............ 709/253 |
| 6,330,614 B1 | * | 12/2001 | Aggarwal et al. .......... 709/236 |
| 6,366,656 B1 | * | 4/2002 | Lee et al. .................... 379/198 |
| 6,381,239 B1 | * | 4/2002 | Atkinson et al. ........... 370/362 |
| 6,526,464 B1 | * | 2/2003 | Jobs et al. ................... 710/300 |
| 6,532,500 B1 | * | 3/2003 | Li et al. ....................... 710/15 |

OTHER PUBLICATIONS

The I$^2$C-Bus Specification, Version 2.1, Jan. 2000, pp. 1-46.

* cited by examiner

*Primary Examiner*—Khanh Dang
*Assistant Examiner*—Thomas J. Cleary
(74) *Attorney, Agent, or Firm*—Harrity & Snyder LLP

(57) ABSTRACT

A two wire serial bus is connected between different circuit boards in a complex electrical system. The two wire serial bus may be used to receive status information about each of the circuit boards in the system. A master control processor on one of the circuit boards controls which of the other circuit boards are active on the serial bus. Each of the non-master circuit boards includes a series of switches that electrically isolate or connect portions of the two wire serial bus from one another. Through the series of switches, both the master control processor and processors local to each of the other circuit boards may simultaneously access different portions of the serial bus.

24 Claims, 7 Drawing Sheets

MULTI-MASTER AND DIVERSE SERIAL BUS IN A COMPLEX ELECTRICAL SYSTEM

BACKGROUND OF THE INVENTION

A. Field of the Invention

The present invention relates generally to routing systems and more particularly, to a serial bus for managing components in a routing system.

B. Description of Related Art

Conventional networks typically include routers that route packets from one or more sources to one or more destinations. A packet is a variable size record that is transmitted through a network. A router is a network device that receives packets containing data and control information at input ports and, based on destination or other information included in the packets, routes the packets to appropriate output ports that lead to either the next router in the packet's journey or to the packet's final destination. Routers determine the proper output port for a particular packet by evaluating header information included in the packet.

A router may include multiple integrated circuits (ICs) and multiple circuit boards operating in conjunction with one another. Serial buses, such as a two-wire serial bus, may be used to exchange control information between various ICs in the router. This type of serial bus is commonly used in a variety of microcontroller-based applications as a control, diagnostic, and power management bus. One such two-wire serial bus standard is available from Philips Semiconductor Corporation and is known as the inter-IC or $I^2C$ serial bus.

FIGS. 1A and 1B are diagrams illustrating common connection schemes using a conventional two-wire serial bus. As shown in FIG. 1A, the serial bus 105 connects multiple devices 106 to a microcontroller 101 through a bus controller 102. Microcontroller 101 may communicate with bus controller 102 using, for example, twelve signal & data lines. The bus controller 102 implements the protocol for the two-wire serial bus 105. In operation, each of devices 106 are assigned a bus identification number. Microcontroller 101, when it wishes to communicate with a particular device 106, instructs bus controller 102 to initiate communication with the device having the appropriate identification number. The bus controller 102 then transfers data between the identified device 106 and the microcontroller 101.

As mentioned, each of devices 106 is assigned a unique bus identification number. This can be problematic in systems having a large number of devices, however, as the number of available addressing options may be limited. Additionally, increasing the number of connected devices in a two-wire serial bus having a large number of connected devices 106 makes the bus increasingly vulnerable to a failure due to corruption of the bus lines by a single failing device.

One conventional solution to the above-noted problems in large two-wire serial bus systems is to use multiplexers to isolate multiple devices on the same bus. Such a two-wire serial bus is shown in FIG. 1B, in which a multiplexer 112 connects bus controller 102 to multiple "sub-buses" 113 and 114. Each sub-bus may include multiple devices 106. Devices in different sub-buses 113 and 114 can share the same address. Based on control signals from microcontroller 101, multiplexer 112 selects which of sub-buses 113 and 114 is the active bus. The non-active sub-bus is essentially isolated from the two-wire serial bus and bus controller 102.

Although the multiplexing scheme shown in FIG. 1B solves a number of problems of the non-multiplexed two-wire serial bus, the multiplexing scheme is inconvenient in systems having multiple circuit boards. More specifically, if multiple multiplexers 112 were placed on a number of different circuit boards, bus controller 102 would have to transmit control signals to each of the multiplexers on the separate circuit boards. Additionally, it may be desirable to connect multiple microcontrollers 101 or bus controllers 102 on different circuit boards without routing extensive control logic between the circuit boards.

Thus, there is a need in the art to efficiently implement a two wire serial bus between ICs spanning multiple circuit boards.

SUMMARY OF THE INVENTION

Systems and methods consistent with the present invention address this and other needs through a multi-master serial bus that spans multiple circuit boards using a relatively small number of additional control lines.

One aspect of the present invention is directed to a system comprising a master control processor, a bus controller, and a midplane. The bus controller is connected to the master control processor and implements a serial bus interface between the master control processor and a plurality of serial bus devices. The master control processor and the bus controller are located on a first circuit board. Moreover, additional circuit boards are connected to the serial bus interface through the midplane. Each of the additional circuit boards includes a switch that electrically connects or isolates the circuit board from the master processor and bus controller. Local control logic outputs a signal that controls the state of the switch.

A second aspect of the present invention is directed to a network device in a computer network that includes a routing engine and a packet forwarding engine. The packet forwarding engine additionally includes a midplane, a first circuit board having a master control processor, and second circuit boards each having a control processor. The first and second circuit boards are electrically coupled through the midplane and the second circuit boards each additionally include a switch configured to electrically connect, when in a first state, or disconnect, when in a second state, the second circuit board from the first circuit board via a serial control bus. The switch of a particular one of the second circuit boards is in the first state only when the switches on each of the other of the second circuit boards are in the second state.

Yet another aspect of the present invention is directed to a circuit board comprising first, second, and third switches. The first switch selectively connects or disconnects a first portion of a two wire serial bus from an external circuit board to a second portion of the two wire serial bus. The second switch selectively connects or disconnects the second portion of the two wire serial bus to a third portion of the two wire serial bus. The third switch selectively connects or disconnects the third portion of the two wire serial bus to a fourth portion of the two wire serial bus. Additionally, the circuit board includes a local processor, a bus controller, and a local control logic circuit that controls the state of the first, second, and third switches.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

As described herein, a two wire serial bus connects multiple devices spanning a number of different circuit boards. A master processor can communicate with each of the connected circuit boards, while micro processors local to the circuit board can use devices on the two wire bus that share the same circuit board as the local processor. Control logic selectively blocks the processors from portions of the bus such that at any particular time only one control processor is active on any particular portion of the bus.

Figure 1A:
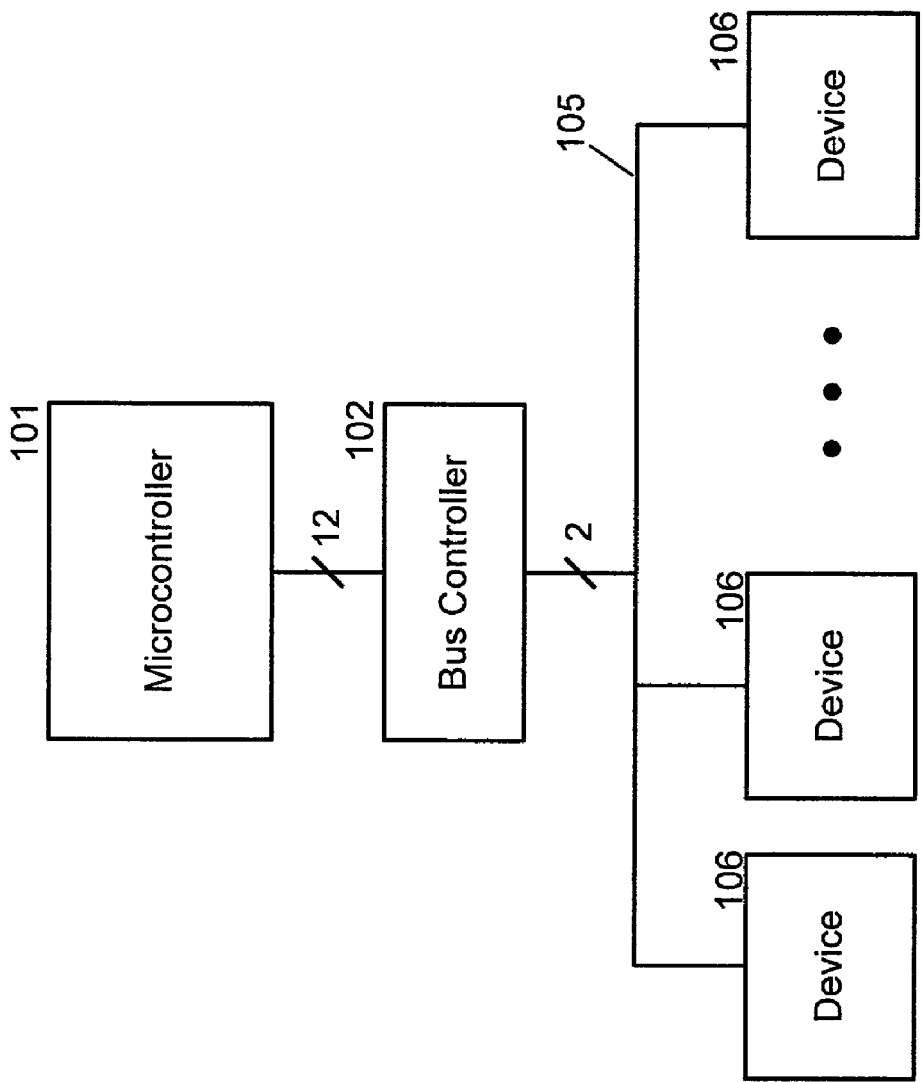
FIGS. 1A and 1B are diagrams illustrating common connection schemes using a conventional two-wire serial bus.
Figure 1B:
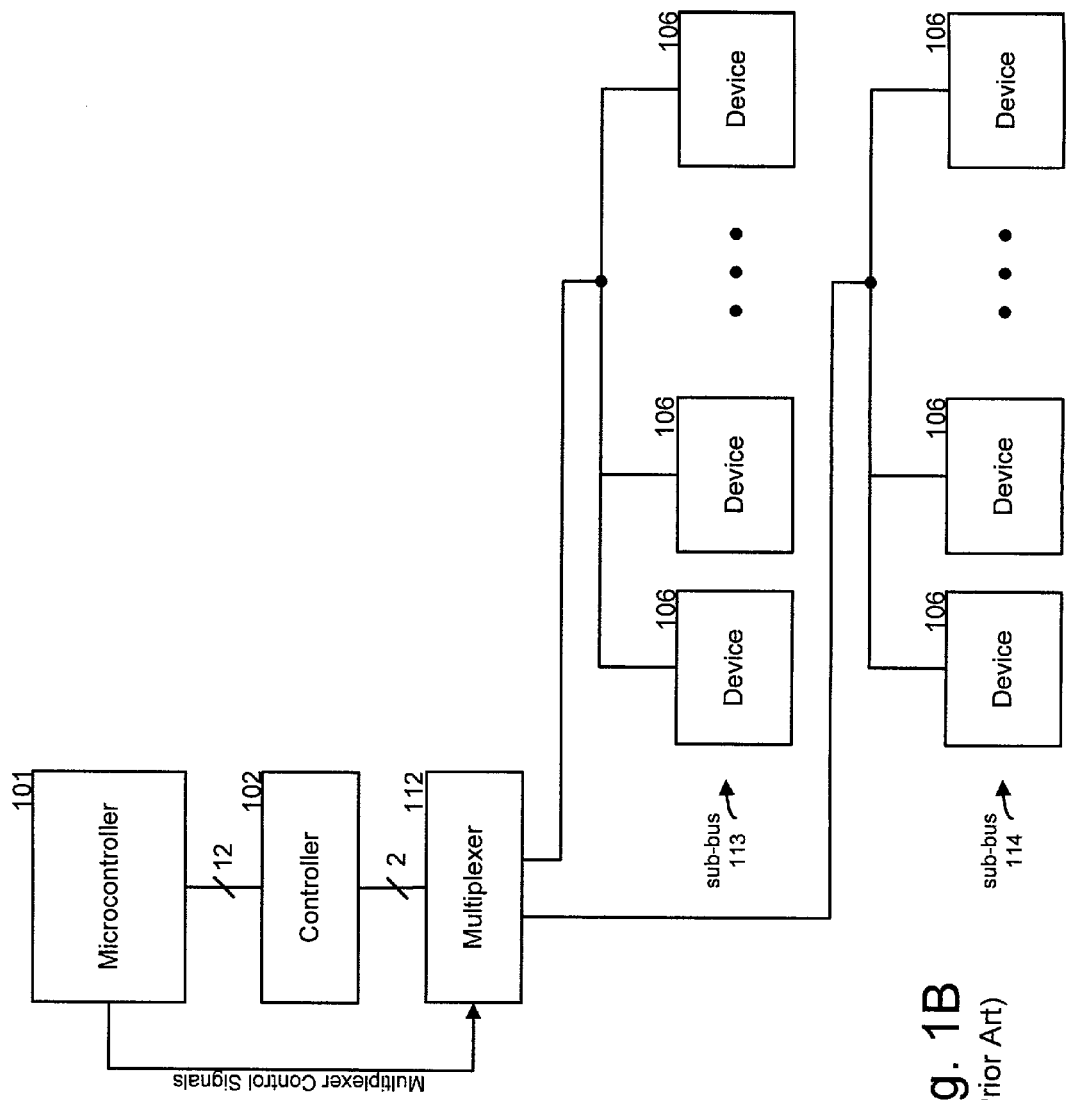
Figure 2:
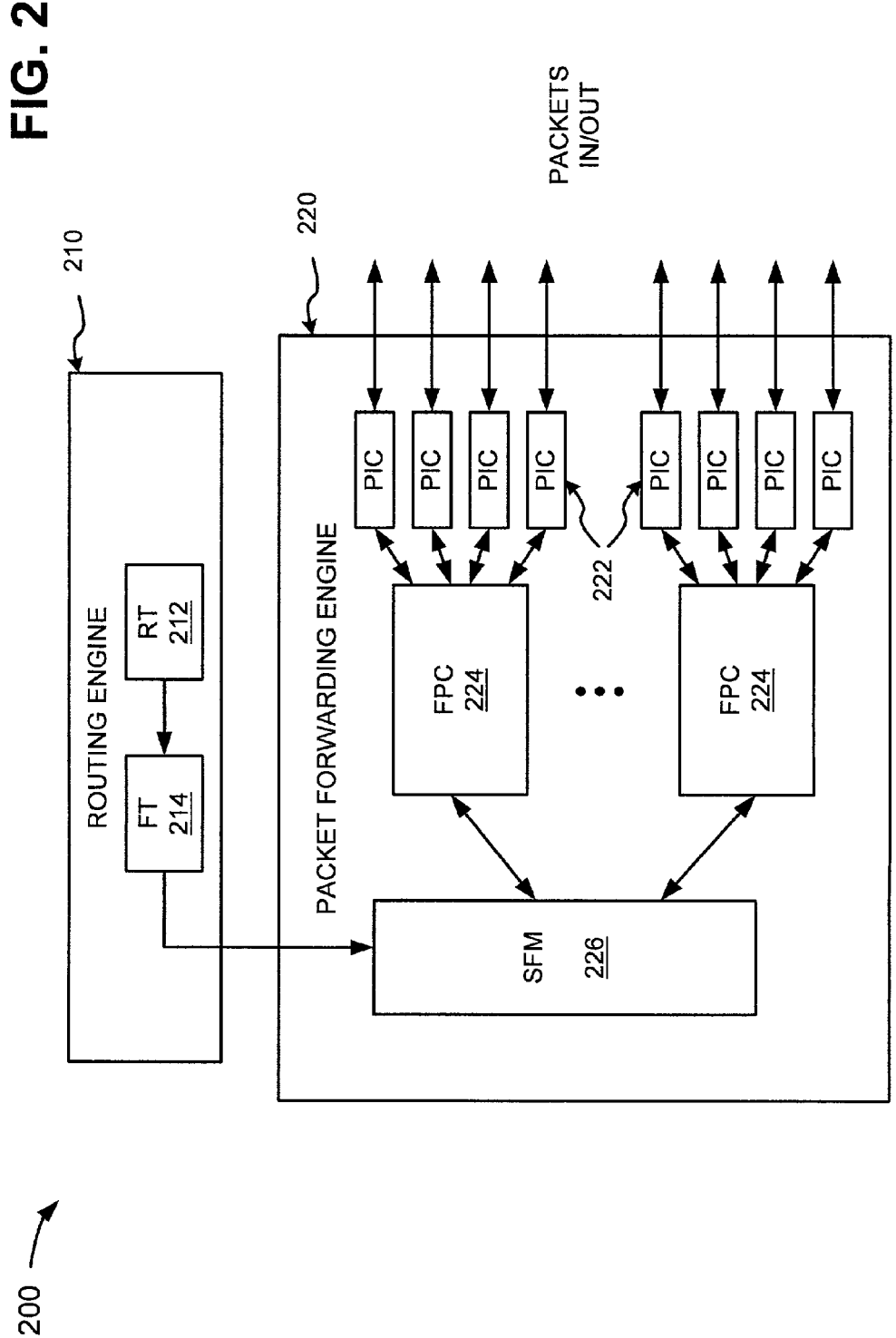
FIG. 2 is a diagram of an exemplary network device in which systems and methods consistent with the present invention may be implemented.

FIG. 2 is a diagram of an exemplary network device in which systems and methods consistent with the present invention may be implemented. In this particular implementation, the network device takes the form of a router 200. The router 200 may include a routing engine 210 and a packet forwarding engine 220. The routing engine 210 may perform routing updates and system management operations for the router 200. The routing engine 210 may include one or more routing tables 212 and a forwarding table 214. The routing table(s) 212 may consolidate routing information learned from routing protocols in the network. From the routing table(s) 212, the routing engine 210 determines the active routes to network destinations and records these routes in the forwarding table 214.

The packet forwarding engine 220 may make packet forwarding decisions for the router 200. The packet forwarding engine 220 may include programmable interface cards (PICs) 222, flexible PIC concentrators (FPCs) 224, and one or more switching and forwarding modules (SFMs) 226. The PICs 222 may include media-specific logic that performs, for example, framing and checksum verification. Different types of PICs 222 may operate according to different transmission rates, such as OC-192 and OC-48 transmission rates, and protocols, such as the Synchronous Optical Networking (SONET), Asynchronous Transfer Mode (ATM), and Ethernet protocols.

The FPCs 224 may include input/output control logic that directs and manages the packets received and transmitted by the PICs 222. The FPCs 224 may, for example, count packets and bytes, apply class-of-service rules to packets, prioritize packets, and perform basic packet integrity checks. The SFMs 226 may include logic that determines how to route the packets. The SFMs 226 may operate upon packet header information received from the FPCs 224 to identify the PIC 222 to output the packet. The SFMs may use a forwarding table make this determination. The forwarding table may obtain a copy of the forwarding table 214 from the routing engine 210.

The FPCs 224 may include input/output control logic that directs and manages the packets received and transmitted by the PICs 222. The FPCs 224 may, for example, count packets and bytes, apply class-of-service rules to packets, prioritize packets, and perform basic packet integrity checks. The SFMs 226 may include logic that determines how to route the packets. The SFMs 226 may operate upon packet header information received from the FPCs 224 to identify the PIC 222 to output the packet. The SFMs may use the forwarding table 228 to make this determination. The forwarding table 228 may obtain a copy of the forwarding table 214 from the routing engine 210.

The routing engine 210 and packet forwarding engine 220 may be configured as a number of circuit boards in the router 200. For example, the packet forwarding engine 220 may include separate circuit boards for the SFMs 226 and the FPCs 224 interconnected by a midplane.

Figure 3:
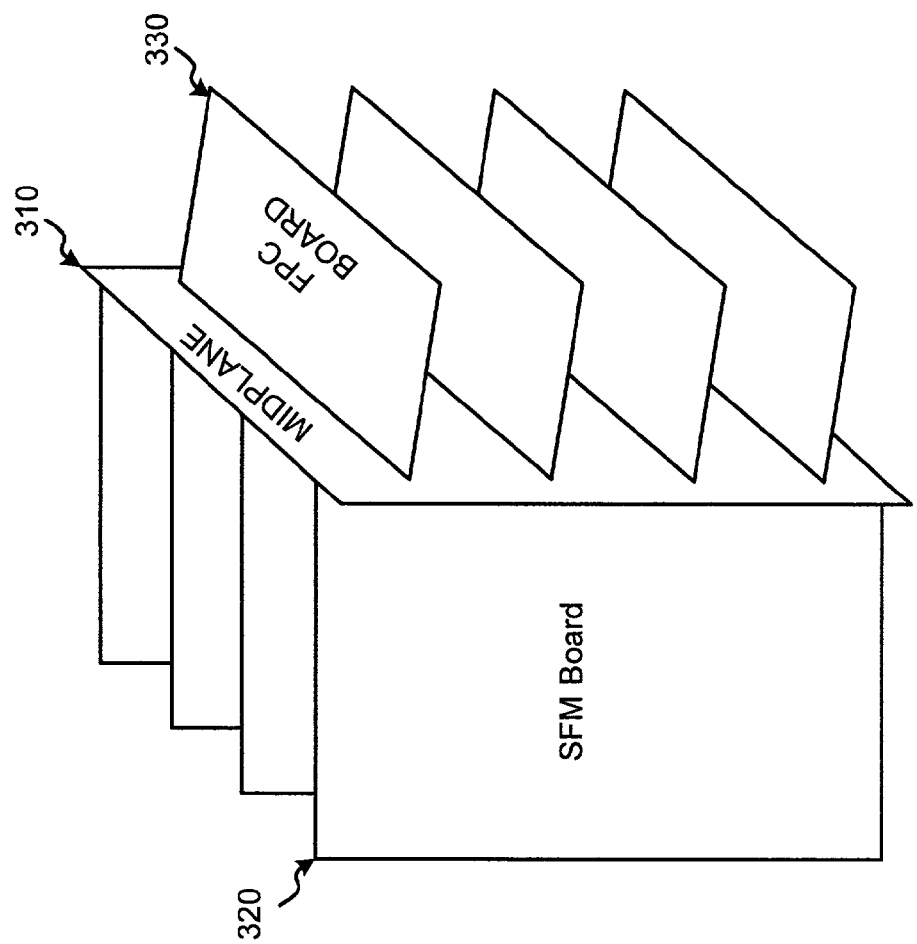
FIG. 3 is an exemplary diagram of a midplane that connects various circuit boards in a router.

FIG. 3 is an exemplary diagram of a midplane that connects the various circuit boards in router 200. As shown, the midplane 310 interconnects circuit boards 320, which implement the SFMs 226, with circuit boards 330, which implement the FPCs 224. Each of circuit boards 330 and 320 may include one or more processors that monitor and control physical state information of the circuit board, such as the board's operating temperature and voltage.

Figure 4:
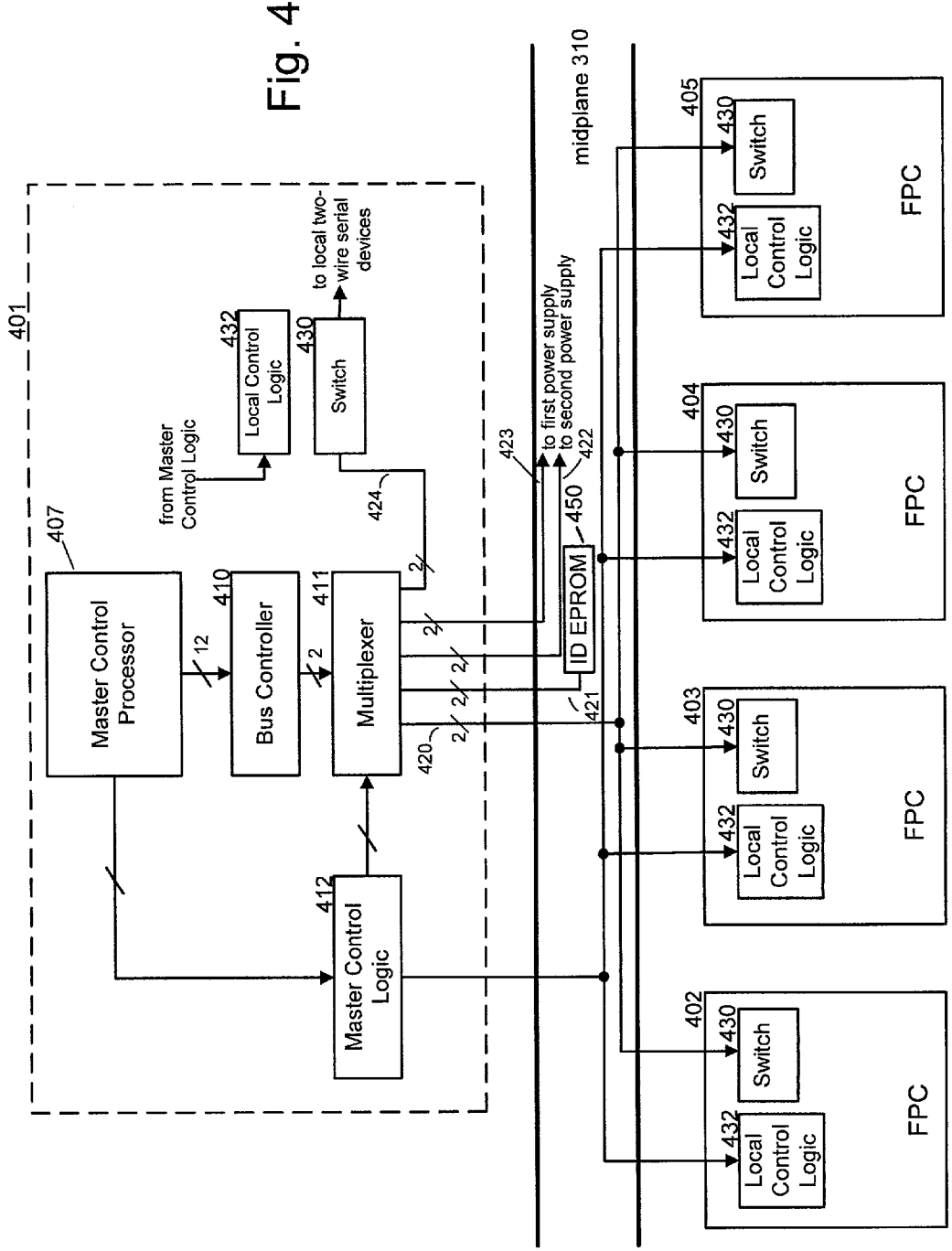
FIG. 4 is a high level diagram illustrating a two wire serial bus consistent with the present invention.

FIG. 4 is a high level diagram illustrating a two wire serial bus consistent with the present invention and implemented in the context of a network router 200.

A number of circuit boards 401–405, such as FPC boards 330, are connected to one another through the midplane 310. One of the circuit boards, circuit board 401, contains a master control processor 407 that communicates with circuit boards 402–405 via the two wire serial bus. Circuit board 401 additionally includes a bus controller 410, a multiplexer 411, and master control logic 412. Bus controller 410 implements the two wire serial bus between master control processor 407 and circuit boards 402–405. Control logic 412, based on signals from master control processor 407, instructs multiplexer 411 to connect the signals from bus controller 410 to one of the two wire serial sub-buses 420–424.

Circuit board 401 may additionally include a number of external serial devices, such as, for example, a temperature sensor IC, a voltage sensor IC, an ID EPROM, a voltage margining control device, and a frequency margining control device. The external devices are connected to master control processor 407 through two wire serial sub-bus 424, which is transmitted from a tap of multiplexer 411 and through a switch 430. The temperature sensor device may measure its external temperature which may be read by master control processor 407. The voltage monitor device measures power supply voltages on circuit board 401. The ID EPROM stores information in non-volatile memory, such as an identification number for circuit board 401. Voltage margining control and frequency margining control devices may be connected through parallel I/O expander devices which provide a plurality of individual control lines.

Two wire serial sub-bus 420 connects master control processor 407, through midplane 310, to switch 430 of boards 402–405. Control information used to facilitate the operation of two wire serial bus 420 at circuit boards 402–405 is similarly routed over midplane 310 and is received by local control logic circuits 432. The operation of two wire serial bus 420 in circuit boards 402–405 will be described in more detail below. Switch 430 and local control logic 432 may similarly be implemented on circuit board 401. In this situation, serial sub-bus 424 may optionally be merged with sub-bus 420, and circuit board 401 can appear functionally like circuit boards 402–405.

In addition to the two wire sub-buses 420 and 424, multiplexer 411 controls sub-busses 421–423. Sub-bus 421 leads to devices on midplane 310, such as an ID EPROM 450 that may store midplane identification information. Sub-buses 422 and 423 may lead through the midplane to first and second (alternate) power supply components, respectively. Through sub-buses 422 and 423, master control processor 407 may receive status information relating to the first and second power supplies.

Two wire sub-bus 420 traverses midplane 310 and connects to switch 430 on each of circuit boards 402–405. At any one time, only one of switches 430 connect the two wire sub-bus 420 to its circuit board; the other switches 430 present an electrical open state (i.e., an electrical disconnect) to the two wire bus. Local control logic 432 on each of circuit boards 402–405 controls the state of switch 430 based on signals received from master control logic 412 over the midplane 310. Thus, at any given time, only one of circuit boards 402–405 can be accessed by master control processor 407.

Figure 5:
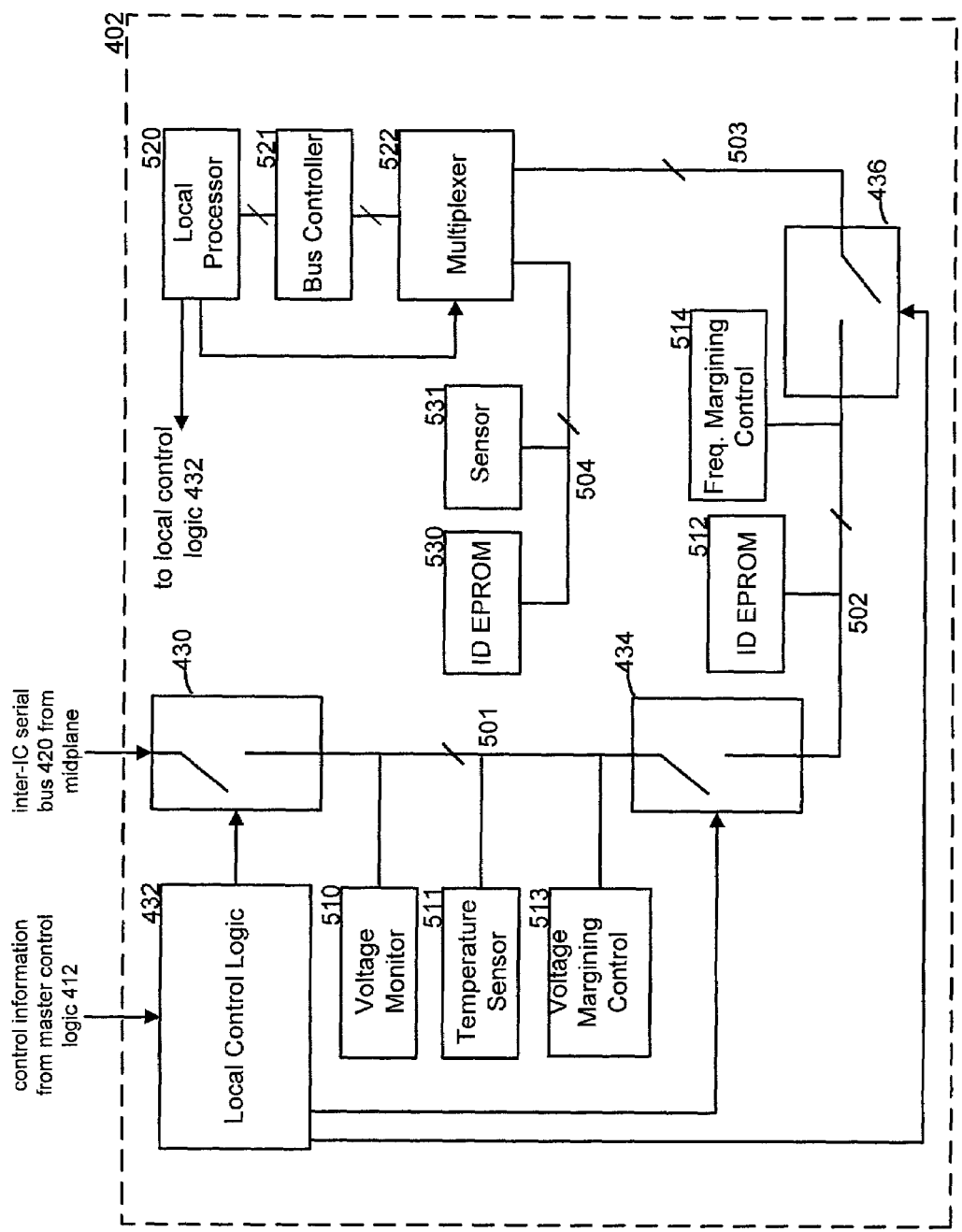
FIG. 5 is a block diagram illustrating a circuit board using the two wire serial bus.

FIG. 5 is a block diagram illustrating one of circuit boards 402–405 in more detail. As previously discussed, local control logic 432 in circuit board 402 receives control information from master control logic 412 over midplane 310. The control information from master control logic 412 may be transmitted over, for example, 13 signal and data lines. The operation state of switch 430 is controlled by local control logic 432 to either open or close the switch 430. When closed, switch 430 connects its circuit board to circuit board 401; when open, switch 430 isolates its circuit board from the remainder of router 200 accessed by two wire serial bus 420.

As shown in FIG. 5, in addition to switch 430, two wire serial bus 420 passes through switches 434 and 436, both of which are controlled by local control logic 432. Between switch 430 and 434 (shown as bus segment 501), and between switch 434 and 436 (shown as bus segment 502), a number of bus devices may be placed on two wire serial bus 420. As shown, these devices may include a voltage monitor 510, a temperature sensor 511, an ID EPROM 512, voltage margining control device 513, and frequency margining control device 514. Voltage margining control device 513 and frequency margining control device 514, in contrast to devices 510–512, are control type (output) devices, through which the master processor 407 or local processor 520 may change the physical state of the circuit board.

Local processor 520, which may be, for example, a control processor for an FPC 224, is connected to two wire serial bus portion 503 through bus controller 521. In this manner, portions of two wire serial buses 420 (i.e., portion 501–503) can, at differing times, have either local processor 520 or master control processor 407 as a bus master. Local processor 520 may be connected to two wire serial buses 501–503 through multiplexer 522. In this situation, local processor 520 controls multiplexer 522 to connect bus controller 521 to the shared two wire serial bus 420 or to a second two wire serial bus, labeled as bus 504, that is accessible only by local processor 520. Serial bus devices, such as ID EPROM 530 and sensor 531 may be connected to two wire serial bus 504.

Local control logic 432 and master control logic 412 operate together to perform global switching between circuit boards 402–405 and local switching at a selected circuit board 402–405. More specifically, regarding global switching, only one of circuit boards 402–405 should be active on two wire serial bus 420 at any particular time. Accordingly, at any particular time, master control logic 412 signals only one of local control logic circuits 432 to close its associated switch 430. The local control logic circuits of the other, non-active circuit boards open their associated switches 430 to thereby isolate these circuit boards from the portion of two wire serial bus 420 external to the circuit board. Accordingly, devices on different ones of circuit boards 402–405 can have the same serial bus address. Additionally, a malfunctioning device on one of the circuit boards does not affect devices on the other circuit boards.

Local control logic 432 of each circuit board 402–405 controls switches 434 and 436 so that local processor 520 and master control processor 407 may, at different times, access overlapping portions of the serial bus 501–503 but yet remain electrically isolated from one another. More particularly, on any particular circuit board, when switch 434 is closed, either switch 430 or switch 436 may be open. If master processor 407 requests access to the circuit board, local control logic 432 closes switch 430 and denies requests from local processor 520 to close switch 436. If master processor 407 is not accessing the circuit board, then switch 430 is open, and local control logic 432 will permit local processor 520 to close one or both of switches 434 and 436. Thus, depending on the state of switches 430, 434, and 436, either local processor 520 or master processor 407 may have control of the two wire serial bus segments 501 and 502 on circuit boards 402–405.

To increase overall reliability of router 200, it may be desirable to implement a redundant master control processor 407. This may be achieved by using a backup control circuit board 401.

Figure 6:
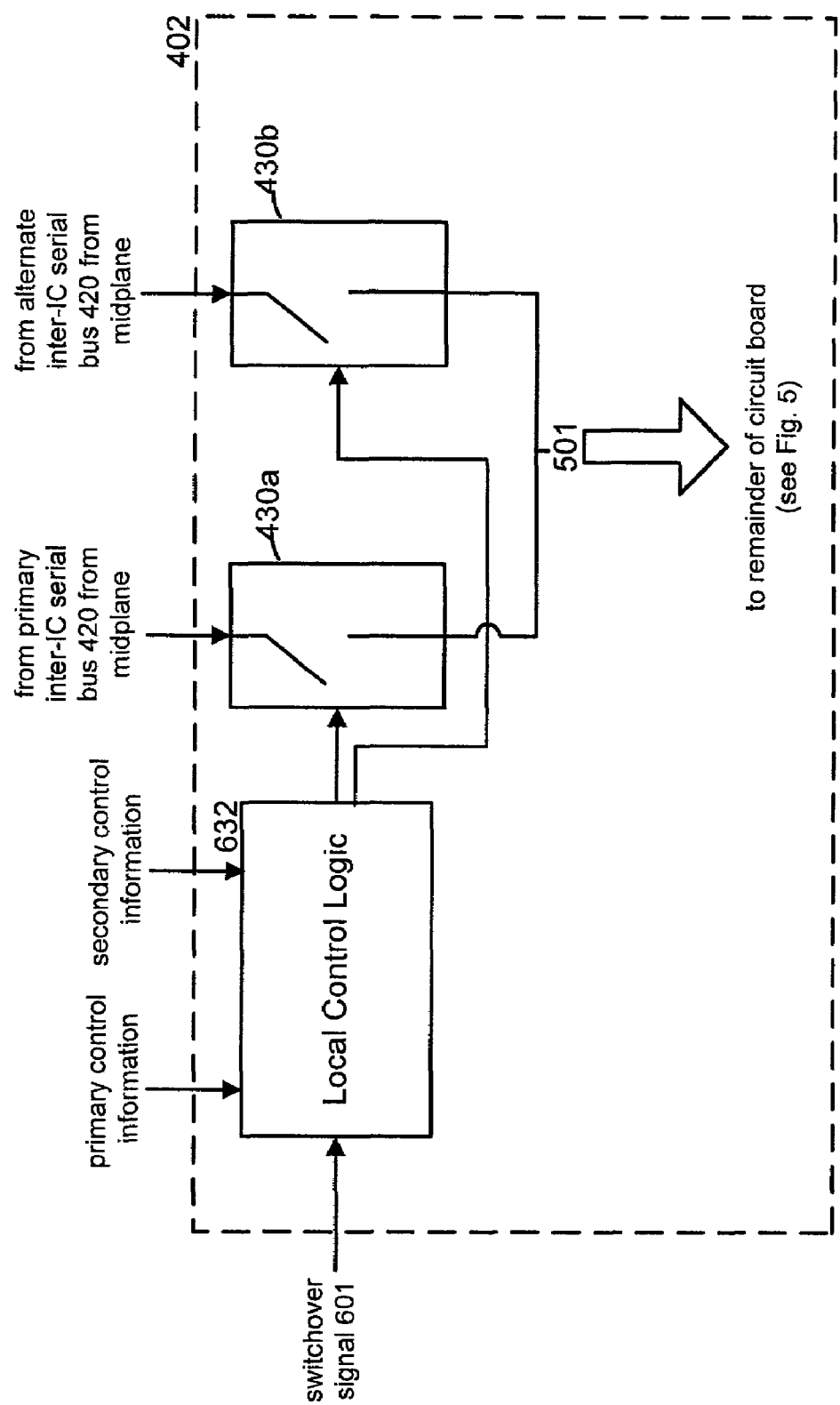
FIG. 6 is a diagram illustrating an implementation of the circuit board of FIG. 5 in a redundant system.

FIG. 6 is a diagram illustrating an implementation of circuit boards 402–405 for use with a redundant two wire serial bus associated with a redundant master processor.

The circuit board shown in FIG. 6 is similar to that shown in FIG. 5, with the primary difference being that two switches 430*a* and 430*b* are used in place of switch 430. Switch 430*a* receives the two wire serial bus from the active master controller. Switch 430*b* receives the two wire serial bus from the standby master controller. Local control logic 632 controls the operation of each one of switches 430*a* or 430*b* as described above regarding local control logic 432. In normal operation, switch 430*b* is open and switch 430*a* is active (i.e., controlled by control logic 632, as described above, to share the two wire bus with the master and local processor). In the event of a switch-over from the active to the standby master controller, a switch-over signal 601 causes control logic 632 to designate the standby master controller as the active controller. Switch 430*a* is then "permanently" opened by control logic 632 and switch 430*b* is made the active switch. At any given time, at most only one of switches 430*a* and 430*b* are may be closed.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

The scope of the invention is defined by the claims and their equivalents.

What is claimed is:

1. A system comprising:
   a master control processor;
   a bus controller connected to the master control processor and implementing a serial bus interface between the master control processor and a plurality of serial bus devices, the master control processor and the bus controller being on a first circuit board;
   a midplane connected to the bus controller on the first circuit board; and
   a plurality of additional circuit boards connected to the serial bus interface through the midplane, each of the plurality of additional circuit boards including
      one or more of the serial bus devices,
      a switch configured to electrically connect the circuit board corresponding to the switch to the first circuit board through the serial bus interface when the switch is controlled to be in a first state and to electrically isolate the circuit board corresponding to the switch from the serial bus interface on the first circuit board when the switch is controlled to be in a second state, and
      local control logic for outputting a signal for controlling the state of the switch, the local control logic controlling the switch to be in the first state when the switches on each of the other of the plurality of additional circuit boards are in the second state.

2. The system of claim 1, wherein the first circuit board further comprises:
   a master control logic circuit connected to the master control processor, the master control logic circuit communicating with the local control logic of each of the additional circuit boards over the midplane.

3. The system of claim 2, wherein the first circuit board further comprises:
   a multiplexer connected to the output of the bus controller and dividing the serial bus interface implemented by the bus controller into a plurality of sub-buses, only one of the sub-buses being connected to the bus controller by the multiplexer at any given time.

4. The system of claim 3, wherein the serial bus devices include at least one of a temperature sensor, a voltage monitor, and an ID EPROM.

5. The system of claim 3, wherein one of the serial bus devices includes an ID EPROM connected to the midplane.

6. The system of claim 3, wherein one of the sub-buses is connected to the plurality of additional circuit boards.

7. The system of claim 1, wherein each of the plurality of additional circuit boards includes:
   a first switch for selectively connecting or disconnecting a first portion of a serial bus, implemented by the serial bus interface from the first circuit board, to a second portion of the serial bus;
   a second switch for selectively connecting or disconnecting the second portion of the serial bus to a third portion of the serial bus; and
   a third switch for selectively connecting or disconnecting the third portion of the serial bus to a fourth portion of the serial bus.

8. The system of claim 7, wherein each of the plurality of additional circuit boards further includes:
   a local processor; and
   a bus controller interfacing the local processor to the fourth portion of the serial bus;
   the local control logic circuit being connected to receive control information from the first circuit board and the local processor and control the first, second, and third switches based on the received control information.

9. A network device in a computer network comprising:
   a routing engine for consolidating routing information learned from routing protocols in the network; and
   a packet forwarding engine connected to the routing engine, the packet forwarding engine including
      a midplane;
      a first circuit board having a master control processor; and
      a plurality of second circuit boards each having a control processor, the first and second circuit boards being electrically coupled through the midplane via a serial control bus, the second circuit boards each additionally including a switch configured to electrically connect the second circuit board to the first circuit board via the serial control bus when the switch is controlled to be in a first state and to electrically isolate the second circuit board from the serial control bus when the switch is controlled to be in a second state, the switch of a particular one of the second circuit boards being in the first state only when the switches on each of the other of the second circuit boards are in the second state.

10. The network device of claim 9, wherein the network device is a network router.

11. The network device of claim 9, wherein the plurality of second circuit boards each additionally comprises:
    local control logic connected to receive control information from the master control processor and the control processor corresponding to the second circuit board of the local control logic, the local control logic controlling the switch to be in the first or second state based on the received control information.

12. The network device of claim 11, wherein the first circuit board further comprises:
    a master control logic circuit connected to the master control processor, the master control logic circuit communicating with the local control logic of each of the second circuit boards over the midplane.

13. The network device of claim 9, wherein the first circuit board further comprises:
    a bus controller connected to the master control processor and implementing an interface for the serial bus.

14. The network device of claim 13, wherein the first circuit board further comprises:
    a multiplexer connected to the output of the bus controller and dividing the serial bus interface implemented by the bus controller into a plurality of sub-buses, only one of the sub-buses being connected to the bus controller by the multiplexer at any given time.

15. The network device of claim 14, wherein one of the sub-buses includes, as a bus device, at least one of a temperature sensor, a voltage monitor, and an ID EPROM.

16. The network device of claim 14, wherein one of the sub-buses includes, as a bus device, an ID EPROM connected to the midplane.

17. The network device of claim 14, wherein one of the sub-buses is connected to the plurality of second circuit boards.

18. A circuit board comprising:
    a first switch for selectively connecting or disconnecting a first portion of a two wire serial bus from an external circuit board to a second portion of the two wire serial bus;

a second switch for selectively connecting or disconnecting the second portion of the two wire serial bus to a third portion of the two wire serial bus;

a third switch for selectively connecting or disconnecting the third portion of the two wire serial bus to a fourth portion of the two wire serial bus;

a local processor;

a bus controller interfacing the local processor to the fourth portion of the two wire serial bus; and a local control logic circuit connected to receive control information from the external circuit board and the local processor and control the first, second, and third switches based on the received control information.

19. The circuit board of claim 18, wherein the local control logic circuit operates to connect the external circuit board and the local processor to different portions of the two wire serial bus.

20. The circuit board of claim 18, wherein the local control logic circuit controls the first, second, and third switches so that if the first and second switches are connected, the third switch is disconnected.

21. The circuit board of claim 18, wherein the local control logic circuit controls the first, second, and third switches so that if the first switch is connected and the second switch is disconnected, the third switch is connected.

22. The circuit board of claim 18, wherein the local control logic circuit controls the first, second, and third switches so that if the first switch is disconnected, the second and third switch are controlled by the local processor.

23. The circuit board of claim 18, wherein at least one of a voltage monitor and a temperature sensor are connected to the second portion of the two wire serial bus.

24. The circuit board of claim 18, wherein an ID EPROM is connected to the third portion of the two wire serial bus.

* * * * *